United States Patent [19]

Schroeter

[11] 3,742,089

[45] June 26, 1973

[54] CURABLE COMPOSITIONS OF MALEIMIDE SUBSTITUTED AROMATIC MATERIAL

[75] Inventor: Siegfried H. Schroeter, Schenectady, N.Y.

[73] Assignee: General Electric Company, Schenectady, N.Y.

[22] Filed: July 21, 1971

[21] Appl. No.: 164,810

[52] U.S. Cl. ...... 260/873, 117/161 P, 117/161 UN, 204/159.19, 260/41 R, 260/45.8 N, 260/45.9 R, 260/45.95 E, 260/47 UA, 260/78 UA
[51] Int. Cl. ............................................. C08g 39/10
[58] Field of Search ................. 260/78 UA, 47 XA, 260/47 C, 873, 47 UA

[56] References Cited
UNITED STATES PATENTS

| | | | |
|---|---|---|---|
| 2,997,459 | 8/1961 | Schnell et al. | 260/47 XA |
| 3,221,080 | 11/1965 | Fox | 260/860 |
| 3,352,832 | 11/1967 | Barr et al. | 260/78 UA |
| 3,380,964 | 4/1968 | Grundschober et al. | 260/78 UA |
| 3,413,379 | 11/1968 | Schade et al. | 260/78 UA |

*Primary Examiner*—Harold D. Anderson
*Attorney*—Jerome C. Squillaro, John F. Ahern, William A. Teoli et al.

[57] ABSTRACT

Solventless blends are provided of aliphatically unsaturated maleimido substituted aromatic carbocyclic organic materials, and aliphatically unsaturated organic ethers. The blends are convertible to high performance films when cured with ultraviolet radiation on the surface of various substrates to impart improved surface characteristics thereto.

2 Claims, No Drawings

CURABLE COMPOSITIONS OF MALEIMIDE SUBSTITUTED AROMATIC MATERIAL

The present invention relates to solventless blends of imido substituted aromatic carbocyclic organic materials and aliphatically unsaturated organic ethers, which can be employed to impart improved surface characteristics to various substrates, when cured with ultraviolet radiation.

The solventless blends of the present invention comprise, (A) maleimido substituted aromatic carbocyclic organic material having at least two chemically combined maleimido radicals of the formula, (1) 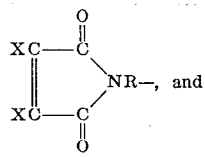

and (B) a vinyl ether of the formula, $$CH=CH_2OY,$$ (2)

where there is utilized in such blends a proportion of (A) to (B) which is sufficient to provide a ratio of maleimido radicals of (A), to vinyl radicals of (B), having a value between 1 to 10 inclusive, and preferably 1 to 5, R is an alkylene radical, X is selected from hydrogen, alkyl, halogen and mixtures thereof, and Y is a monovalent organo radical defined below.

Radicals included by R are preferably alkylene radicals such as methylene, dimethylene, trimethylene, tetramethylene, substituted alkylene radicals such as

where m is an integer equal to 1 to 4 inclusive, and $R^1$ is selected from hydrogen, lower alkyl, such as methyl, and aryl, such as phenyl. Radicals included by X are methyl, ethyl, chloro, fluoro, etc. Radicals included by Y are, for example, $C_{(1-8)}$alkyl, such as methyl, etc., alkenyl, such as, 1-propenyl, vinyl, allyl, etc.; hydroxyalkyl, such as, hydroxymethyl, hydroxyethyl, etc.; haloalkyl, such as, chloromethyl, chloroethyl, bromobutyl, etc., aryl such as phenyl, tolyl, xylyl, etc.; $—R—(OR)-_nZ$, where $n$ is 1 to 100 and Z is selected from hydrogen, hydroxy, oxyalkyl such as oxymethyl, oxyethyl, oxypropyl; oxyalkyenyl, such as oxyvinyl, oxyallyl, etc.

There are included by the maleimido substituted aromatic carbocyclic organic materials having chemically combined radicals of formula 1, monomers and polymers such as bis(maleimidomethyl)toluene, bis(maleimidomethyl)benzene, bis(maleimidomethyl)phenyl ether, etc., maleimido substituted aromatic carbocyclic polyethers, polyesters, polycarbonates, polyamides, polyamide-imides, polyurethanes, polybiurets, polyxylylene, polyarylacetylenes, polyarylsulfides, etc., consisting essentially of chemically combined units of the formula,

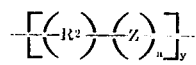

where $R^2$ is an aromatic carbocyclic radical having from six to 18 carbon atoms, or a mixture of such units, with units having polyvalent aliphatic radicals in place of $R^2$ radicals, $a$ has a value of 0 or 1, and $y$ is an integer having a value of 1 to 500, and Z is a divalent connective selected from,

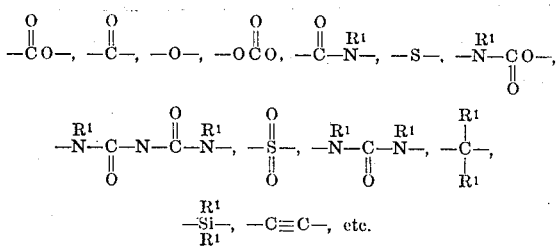

In addition, there also are included imido-alkylene substituted polystyrenes, poly($\alpha$-methylstyrene), polymethyl ($\alpha$-methylstyrene), poly(dimethylstyrene), poly((chlorostyrene), poly(dichlorostyrene), styrene copolymers with butadiene, acrylonitrile, methylmethacrylate, vinylidene-chloride, maleic anhydride, vinylchloride, vinylacetate, vinylamides, $\alpha$-methylstyrene, etc., included by the formula,

where $R^3$ is a monovalent aromatic carbocyclic radical having from six to 18 carbon atoms selected from hydrocarbon radicals and halogenated hydrocarbon radicals, $R^4$ is selected from hydrogen and monovalent hydrocarbon radicals, and $Z'$ is a divalent connective selected from,

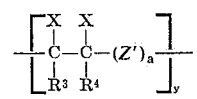

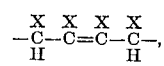

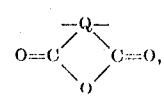

where Q is a divalent organo radical such as derived from R radicals defined above across the double bond. Radicals included by $R^3$ are for example, phenyl, tolyl, xylyl, naphthyl, anthryl; chlorophenyl, chloronaphthyl, etc. Radicals included by $R^4$, are $R^3$ radicals, alkyl radicals such as methyl, ethyl, propyl, etc. D is selected from hydrogen and alkyl radicals, such as methyl, etc.

There are included by the aliphatically unsaturated ethers of Formula 2, ethers such as, methyl vinyl ether, n-butyl vinyl ether, octyl vinyl ether, β-hydroxyethyl vinyl ether, triethylene glycol monovinyl ether, polyethylene glycol mono vinyl ether, divinyl ether, tetraethylene glycol divinyl ether, β-chloroethyl vinyl ether, phenyl vinyl ether, o-chlorophenyl vinyl ether, tolyl vinyl ether, benzyl vinyl ether, diethylene glycol vinyl allyl ether, mixtures thereof, etc.

The maleimido substituted organic polymers utilized in making the solventless blends of the present invention, can be made by the method shown by the copending application of Klebe et al., Ser. No. 838,322, filed July 1, 1969 now abandoned, and assigned to the same assignee as the present invention. The maleimido substituted organic monomers used in the present invention can be made by the method shown by copending application Ser. No. 103,303, of Klebe et al., filed Dec. 31, 1970, also assigned to the same assignee as the present invention.

The above described method of Ser. No. 838,322 involves the employment of the maleimido alkylating agent such as maleimidomethyl chloride and a Friedel Crafts catalyst, such as boron trifluoride in combination with an aromatic carbocyclic polymer as defined above. Imidomethylation is achieved in Ser. No. 103,303, with a mixture of formaldehyde and an aliphatically unsaturated imide such as maleimide, and sulphuric acid. Water can be employed in particular instances in limited amounts.

Included by the aromatic organic compounds which can be imido methylated in accordance with Ser. No. 103,303 to produce the imido methyl substituted aromatic carbocyclic monomers utilized in making the solventless resins of the present invention, are aromatic hydrocarbons, such as benzene, biphenyl, naphthalene, and anthracene; alkyl substituted and organo functional substituted derivatives of such aromatic organic hydrocarbons including toluene, xylene, durene, ethylbenzene, dimethylnaphthalene, benzoic acid, toluic acid, terephthalic acid, 4,4'-dihydroxybiphenyl, phenylmaleimide, etc. In addition, halogen substituted aromatic compounds, such as chlorobenzene, bromonaphthalene, chlorinated biphenyl, etc. Diphenyl compounds, such as diphenyl ether, diphenyl sulfone, diphenyl carbonate, diphenyl methane, and 2,2-diphenyl propane.

The above described blends of maleimide substituted aromatic carbocyclic materials and vinyl ethers can contain non-volatile components such as ultraviolet radiation photosensitizers, for example, ketones such as benzophenone, acetophenone, benzil, benzyl methyl ketone; benzoins and substituted benzoins such as benzoin methyl ether, α-hydroxymethyl benzoin isopropyl ether; halogen containing compounds such as α-bromoacetophenone, p-bromoacetophenone, α-chloromethylnaphthalene, sulfur compounds such as thiuranmono and disulfides, or aromatic disulfides, and other photosensitizers such as azides, thioketones, or mixtures thereof; stabilizers, antioxidants and ultraviolet stabilizers such as hydroquinone, tert-butyl hydroquinone, tert butyl catechol, p-benzoquinone, 2,5-diphenylbenzoquinone, 2,6-di-tert-butyl-p-cresol, benzotriazoles such as Tinuvin P, Tinuvin 328 (manufactured by Geigy Corp.), hydroxybenzophenones such as 2,4-dihydroxy-benzophenone, 2-hydroxy-4-methoxy-benzophenone, 4-dodecyl-2-hydroxybenzophenone, substituted acrylonitriles such as, ethyl-2-cyano-3,3-diphenyl acrylate, 2-ethylhexyl-2-cyano-3,3-diphenyl acrylate, etc.; various fillers flatting agents, thixotroptic agents, dyes and pigments such as, barytes, blanc fixe, gypsum, calcium carbonates, quartz, diatomaceous silica, synthetic silica, clay, talc, asbestine, mica, bentonite, aerogels, glass fibers, basic carbonate white lead, antimony oxide, lithophone, titanium dioxide, ultramarine blue, aluminum powder, etc.

Blends of the present invention can readily be made by merely mixing together the maleimido substituted aromatic carbocyclic organic material, the vinyl organic ether and the above described non-volatile components. The sensitizer can be present at 0.1 to 5 percent by weight of the blend; fillers can be present at from 1 to 60 percent by weight of the blend and stabilizers can be present at from 0.2 to 4 percent by weight of the blend.

As shown in copending application Ser. No. 164,624 of A. N. Wright and S. Schroeter, filed concurrently herewith and assigned to the same assignee as the present invention, the solventless blends of the present invention can be converted to high performance films and coatings on a variety of substrates to impart improved characteristics thereto when exposed to ultraviolet radiation.

In order that those skilled in the art will be better able to practice the invention, the following examples are given by way of illustration and not by way of limitation. All partS are by weight.

EXAMPLE 1

A mixture of 97 parts of maleimide, and 60 parts of paraformaldehyde was dissolved in 175 parts of 97.8 percent sulfuric acid, and 32.5 parts of water was added. The mixture was allowed to cool to 45°C. There was added to the mixture 138 parts of toluene, and the mixture was stirred. The temperature of the mixture was maintained at 50°C during addition. After 2 hours, 15 parts of paraformaldehyde was added and stirring of the mixture continued at 50°C for an additional period of 4 hours. A white viscous emulsion formed during the reaction. It was broken by addition of approximately 250 parts of water and about 375 parts of chloroform. The organic layer was separated, washed with dilute sodium bicarbonate solution and water, and dried. The solvent was evaporated and a yellow viscous fluid was extracted with three 33 part portions of hot hexane. After removal of residual solvent in vacuo at 50°C, there was obtained 186 parts of product. The product converted to a thermoplastic solid when allowed to cool at room temperature. The NMR spectrum of the product showed an average of 3 toluene rings, two maleimidomethyl groups and two methylene bridges between rings. Elemental analysis (wt. %) showed: C 73.4; H 5.8; N 4.7, and a molecular weight of 500±5 percent.

Based on method of preparation and analytical data, the product was composed of two maleimido methyl radicals and three tolylene groups, interconnected by methylene radicals.

A composition was prepared with the above described bis-imidomethylated toluene by making a solution of 1 part of such imidomethylated toluene with 0.5 part of vinyl-β-chloro-ethyl ether. A hard transparent film was obtained when the blend was applied to a glass slide, and exposed for 3 minutes under a General Electric H3T7 medium pressure mercury lamp. The transparent film exhibited valuable solvent resistant properties.

EXAMPLE 2

A solventless resin blend was prepared by dissolving 1.55 parts of the bis(imidomethyl) toluene of Example 1, with 0.8 parts of diethylene glycol divinyl ether. The resulting blend was cured to a hard transparent film when it was applied onto a glass slide and exposed under a 275 watt General Electric sunlamp for about 5 minutes. The film was insoluble in organic solvent such as acetone, benzene, or chloroform.

EXAMPLE 3

A blend consisting of the bis(imidomethyl)toluene of Example 1 and diethylene glycol divinyl ether was prepared utilizing 3.1 parts of the bis(imidomethyl)toluene and 1.582 parts of the diethylene glycol divinyl ether along with 0.03 part of benzophenone. A cured film was found to be insoluble in organic solvent, such as acetone, benzene and chloroform as well as exhibiting a pencil hardness of greater than 6H when cured under a 275 watt General Electric sunlamp for 5 minutes.

EXAMPLE 4

A blend of the bis(imidomethyl)toluene of Example 1 and diethylene glycol divinyl ether was prepared utilizing 3.1 parts of the bis(imidomethyl)toluene and 1.582 parts of the ether in combination with 0.03 part of benzophenone. The resulting composition was employed on a polycarbonate panel, which was made from a commercially available polycarbonate resin utilizing enough of the solventless resin to produce a film having a thickness of about 3 mil. The film was cured under a General Electric H3T7 lamp to give a hard transparent coating which could be wiped with acetone, benzene, or chloroform, without showing an effect on the polycarbonate substrate.

EXAMPLE 5

A blend of the bis(imidomethyl)toluene of Example 1, and phenylvinyl ether, utilizing 3.1 parts of the bis-(imidomethyl)toluene and 1.2 parts of the ether, was further combined with 0.75 part of diethyleneglycol divinyl ether. The resulting blend was then applied to a glass slide and cured under a General Electric sunlamp operated at 275 watts for about 5 minutes. There was obtained a cured insoluble transparent film having a pencil hardness of about 6H which exhibited valuable solvent resistance.

EXAMPLE 6

There was blended 2 parts of the bis(imidomethyl)-toluene of Example 1 and 0.4 part of a maleimido methyl substituted polycarbonate, with a mixture of 0.8 part of phenyl vinyl ether, 0.66 part of styrene and 0.5 part of diethylene glycol divinyl ether.

The maleimidomethyl substituted polycarbonate was prepared by reacting 0.27 part of N-chloromethyl maleimide with 5 parts of a commercially available polycarbonate prepared from 2,2-bis(4-hydroxyphenyl)propane having an intrinsic viscosity in dioxane of 25°C of about 0.5. The various reactants were dissolved in 100 parts of anhydrous mixture consisting of about 70 parts of tetrachloroethane and 30 parts of nitrobenzene, boron trifluoride was introduced into the mixture while it was stirred at a rate of one bubble per second over a period of about 50 hours, while the temperature was maintained at about 65°C. A quantitative yield of product was then recovered by precipitation with methanol. Based on method of preparation and elemental analysis, the product was a maleimido methyl substituted polycarbonate having about 25 mole percent of maleimidomethyl substituted bisphenol-A carbonate units.

The above solventless blend was applied to a paint test panel and cured under a General Electric H3T7 lamp for about 5 minutes. There was obtained a cured film exhibiting excellent adhesion and flexibility which was resistant towards acetone, chloroform, benzene and hot water. The film became yellow after being heated in air to 175°C for 60 hours, but still retained good adhesion to the test panel.

Although the above examples are limited to only a few of the very many blends included within the scope of the present invention, it should be understood that the present invention is directed to blends comprising a much broader variety of vinyl organic ether of formula 2 and aromatic carbocyclic organic materials substituted with radicals of formula 1.

I claim:

1. Solventless blends which consist essentially of (A) maleimido substituted aromatic carbocyclic organic material having at least two chemically combined maleimido radicals of the formula,

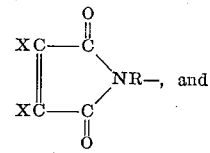

(B) a vinyl ether of the formula,

where there is utilized in such blends a proportion of (A) to (B) which is sufficient to provide a ratio of maleimido radicals of (A), to vinyl radicals of (B) having a value between 1 to 10 inclusive, and where said aromatic carbocyclic organic material of (A) is a mixture of an aromatic carbocyclic organic monomer and a resinous aromatic carbocyclic organic polymer selected from the class consisting of polymers having recurring aromatic carbocyclic radicals in the polymer backbone and polymers having aromatic carbocyclic radicals in the pendant position along the polymer backbone, R is an alkylene radical, X is selected from the group consisting of hydrogen, alkyl, halogen and mixtures thereof, and Y is a monovalent organo radical.

2. A blend in accordance with claim 1, wherein (A) is a mixture of maleimido substituted aromatic carbocyclic organic monomer and arylene polycarbonate.

* * * * *